Patented Sept. 8, 1931

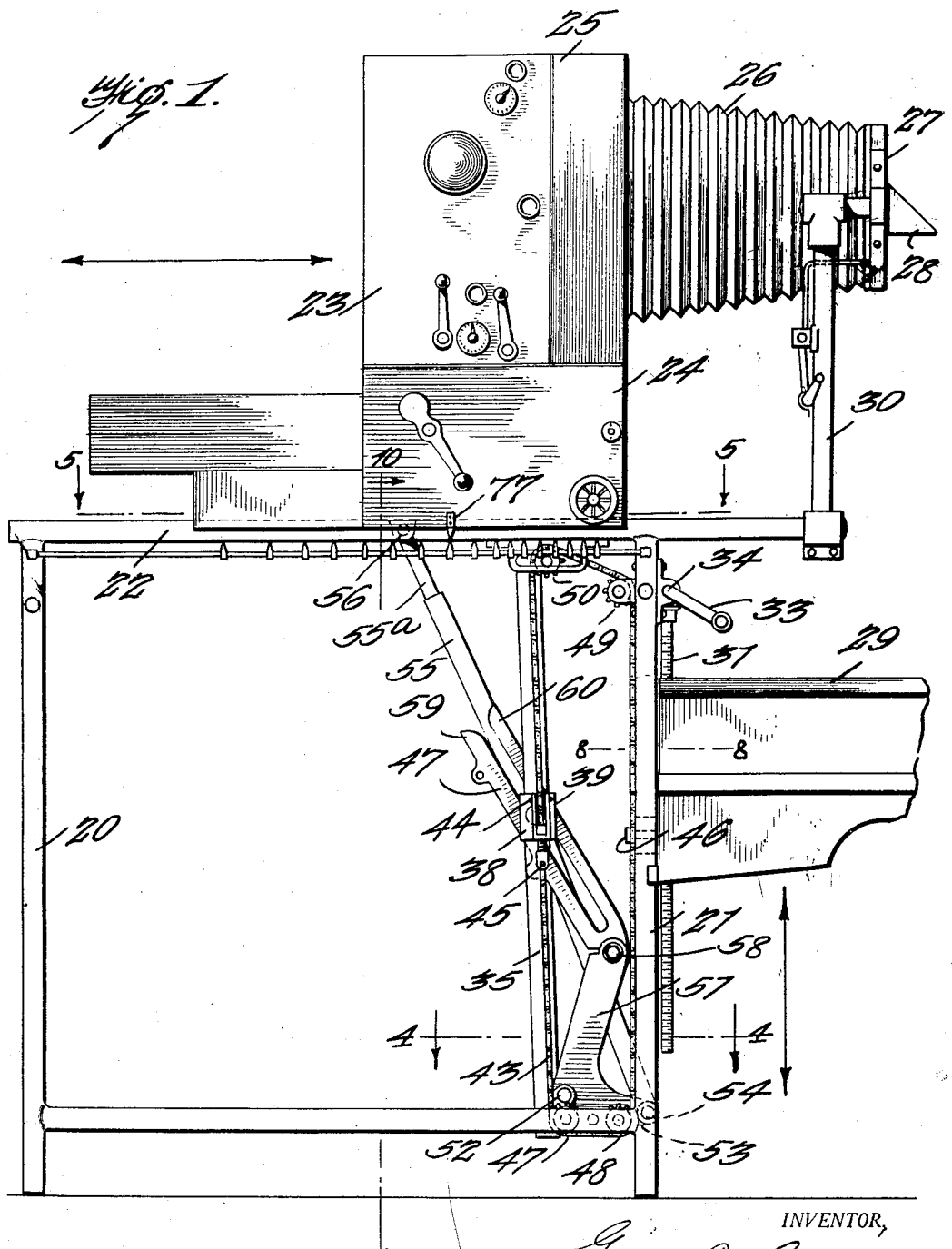

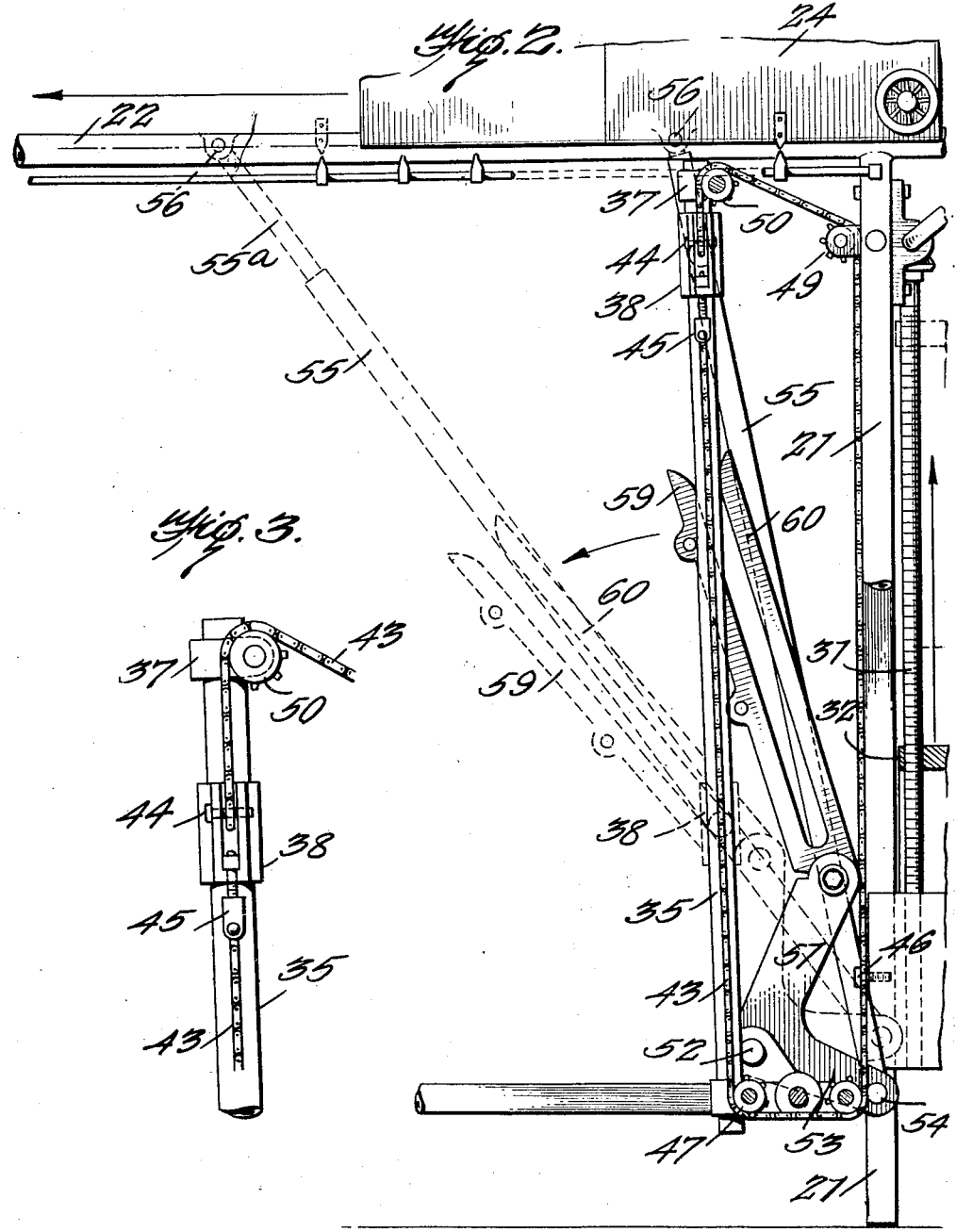

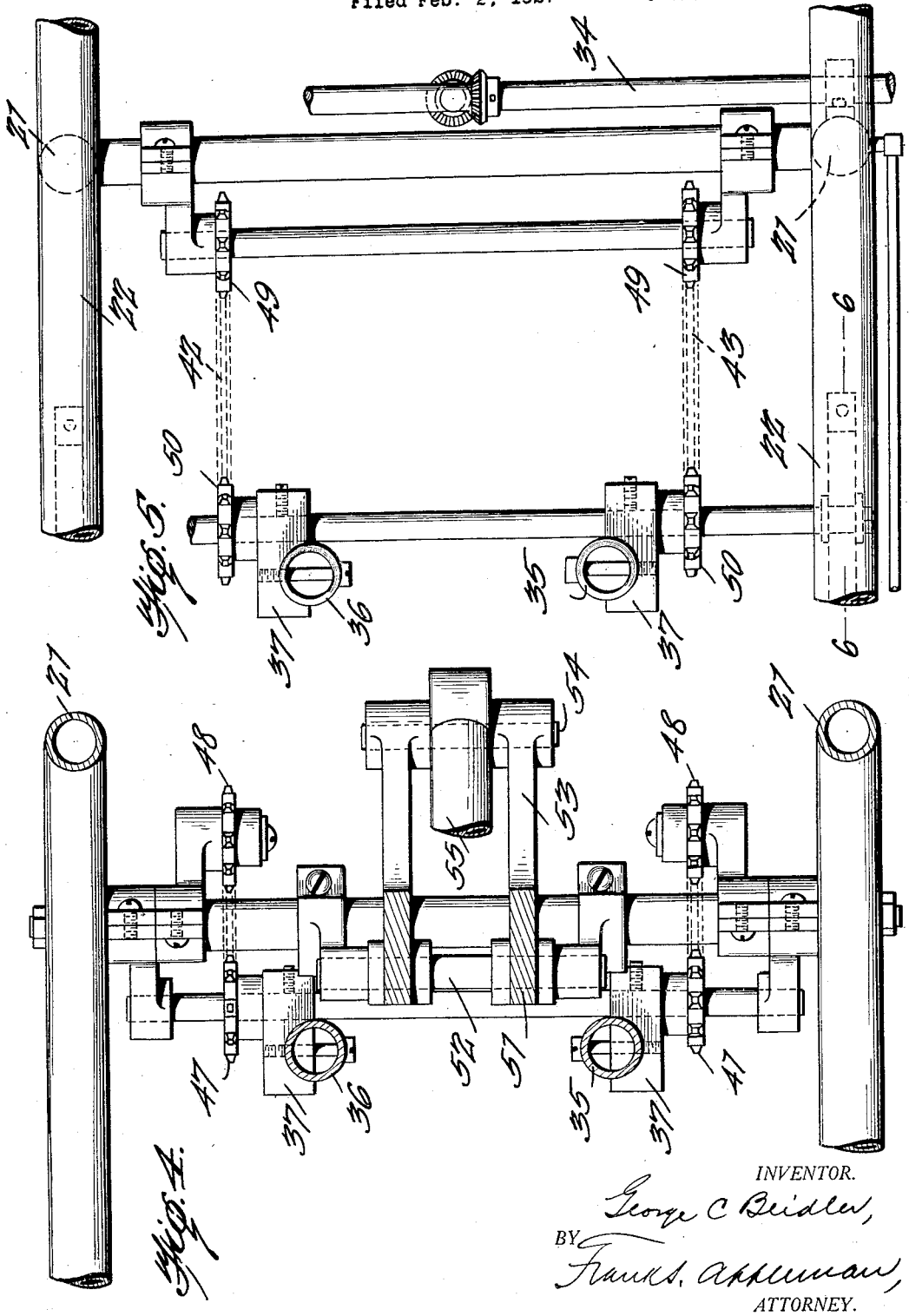

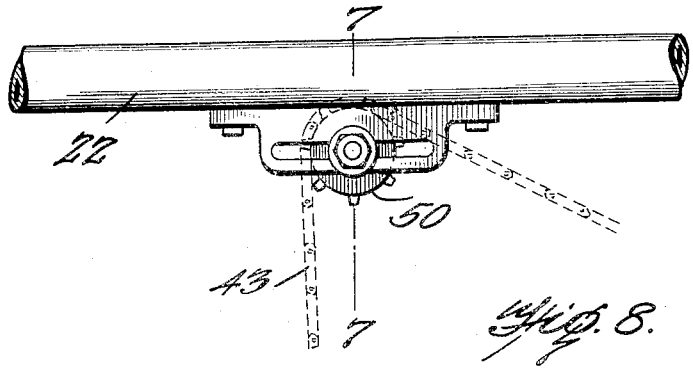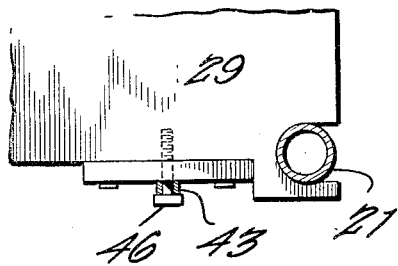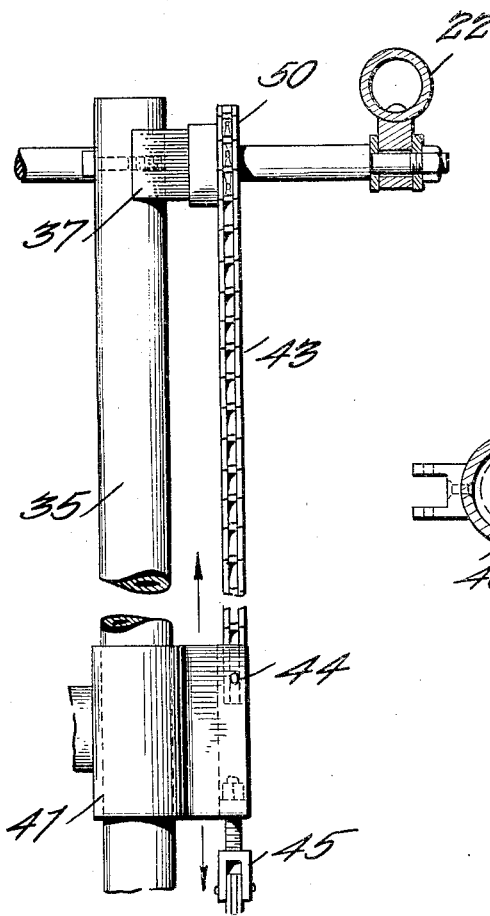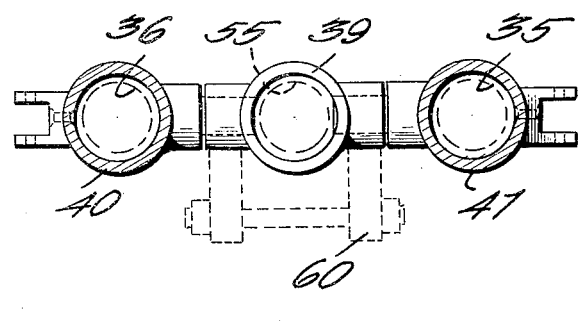

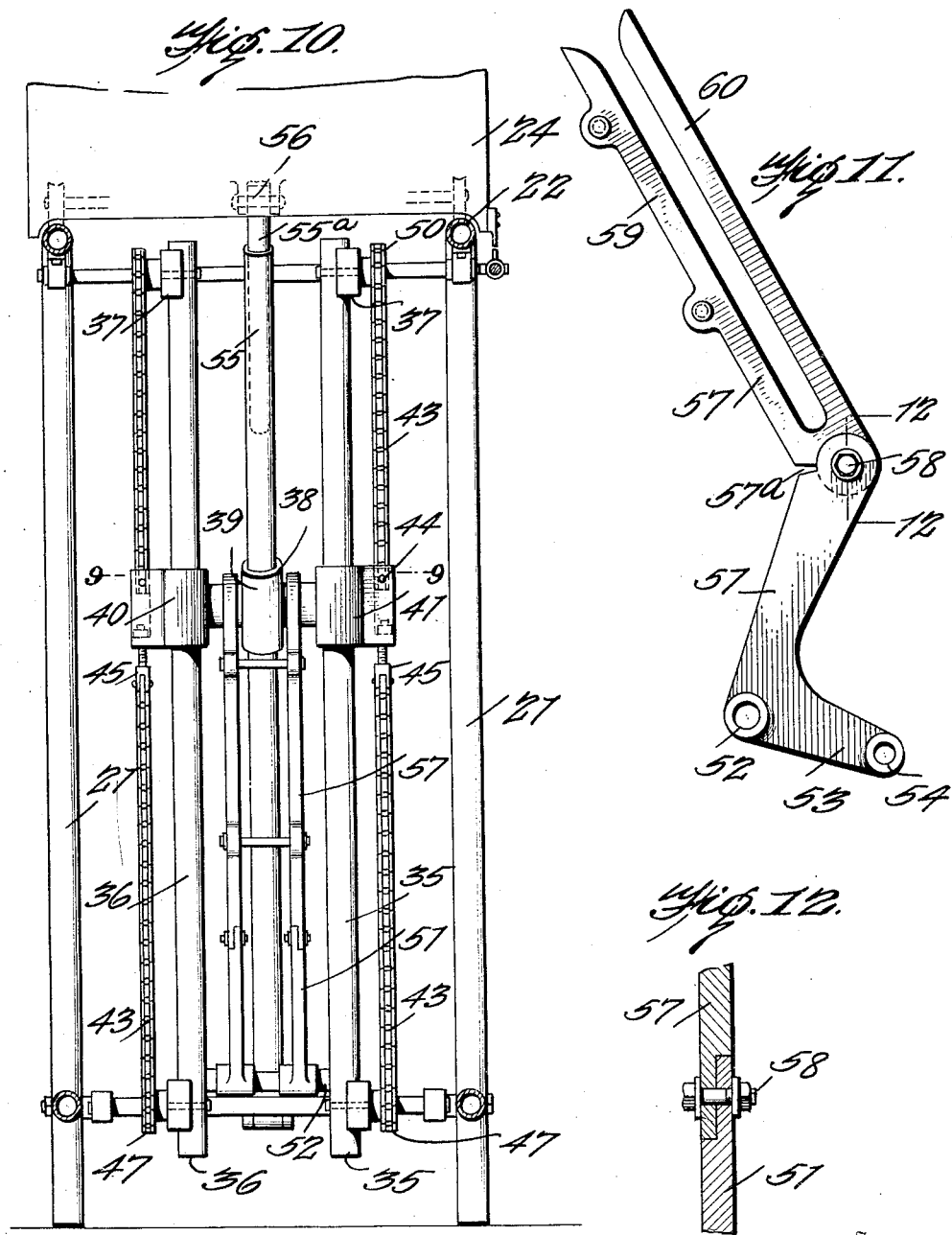

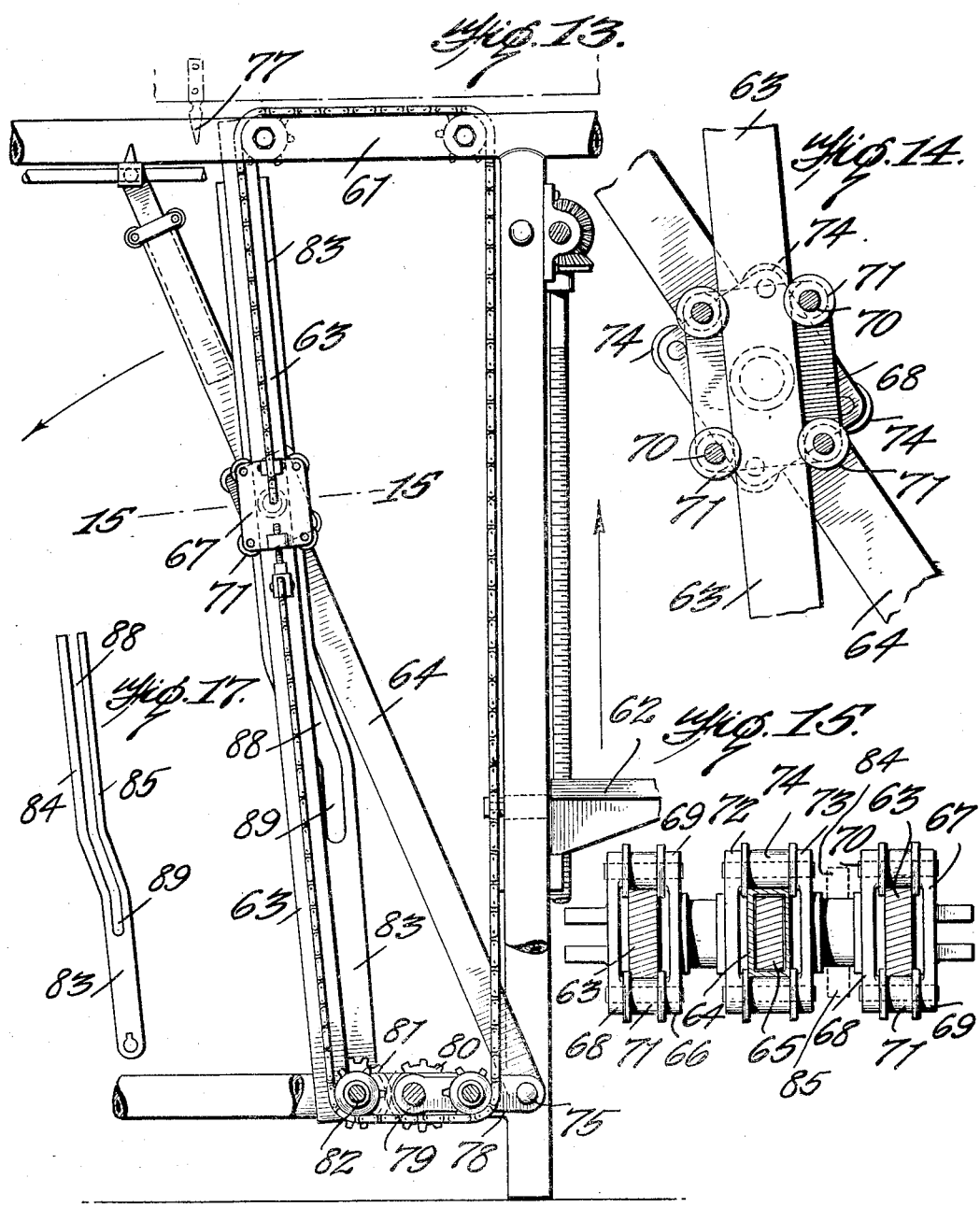

1,821,923

UNITED STATES PATENT OFFICE

GEORGE C. BEIDLER, OF ROCHESTER, NEW YORK

AUTOMATIC FOCUSING DEVICE FOR PHOTOGRAPHING APPARATUS

Application filed February 2, 1927. Serial No. 165,416.

This invention relates to photographing apparatus, and particularly to automatic focusing devices.

It is an object of this invention to produce novel means whereby a copy holder or support and a holder for the sensitized material may be moved simultaneously and in time and distance, whereby the said copy holder and the holder for the sensitized material may be positioned with respect to the interposed light projector or lens.

It is furthermore an object of this invention to produce a device of this character having special adaptation for employment with a light projecting means that includes a prism, since in this last mentioned occasion the copy and the sensitized material are on planes at angles to each other if a single prism and lens is employed.

It is a further object of this invention to provide a copy holder and a holder for sensitized material movable with relation to each other and provided with mechanism whereby they are actuated from the same source of power and in a manner which will cause the said holders to be so positioned with respect to a prism as to maintain a focus automatically, regardless of the positions of the holders within predetermined and normally operative bounds.

It is a still further object of this invention to accomplish the foregoing results by mechanism associated with so-called "commercial" cameras, in which means are present for exposing film in the process of copying documents, books, or other printed matter, writings, illustrations or drawings; and it is furthermore an object of this invention to produce a device of this character which will compensate for the distance around the prism when enlarging or reducing.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a type of commercial camera with a device embodying the invention applied thereto;

Figure 2 illustrates an enlarged detail view in side elevation and partly in section of the operating mechanism;

Figure 3 illustrates a detailed view of part of the mechanism;

Figure 4 illustrates a sectional view on the line 4—4 of Fig. 1;

Figure 5 illustrates a sectional view on the line 5—5 of Fig. 1;

Figure 6 illustrates a sectional view on the line 6—6 of Fig. 5;

Figure 7 illustrates a sectional view on the line 7—7 of Fig. 6;

Figure 8 illustrates a sectional view on the line 8—8 of Fig. 1;

Figure 9 illustrates a sectional view on the line 9—9 of Fig. 10, looking in the direction of the arrows;

Figure 10 illustrates a sectional view on the line 10—10 of Fig. 1;

Figure 11 illustrates a detail view of a lever;

Figure 12 illustrates a sectional view on the line 12—12 of Fig. 11;

Figure 13 illustrates a view in elevation of a fragment of a machine embodying a modification;

Figure 14 illustrates an enlarged view of a lever operating means with one of the sleeves in section;

Figure 15 illustrates a sectional view on the line 15—15 of Fig. 13;

Figure 16 illustrates a detail view of a part of the focusing device; and

Figure 17 illustrates a view in elevation of an auxiliary focusing lever.

The invention is shown applied to a photographing and developing apparatus of the general type of those shown in applicant's patents numbered 1,222,597 of April 17, 1927 and 1,359,481 of November 23, 1920.

A frame having legs 20 and 21 and upper side rails such as 22 support an exposing chamber 23 that is super-imposed on a receptacle 24 which may contain means for subjecting film to treatment in its development, and these are mounted on the side rails 22 for movement longitudinally of the said rails. Obviously, the exposing chamber might be mounted on the rails without the interposition of the part 24, but these are matters of policy in manufacture and will be understood by those skilled in the art. That part of the exposing chamber at the line 25 may be regarded as the location of the sensitized material or the focusing screen, and a bellows 26 connects with the exposing chamber in known manner. For the purpose of this disclosure, it will be assumed that the lens board 27 is supplied with a lens and that a prism 28 will be associated with the instrumentalities just described for erecting an image or copy supported by the copy holder 29.

The exposing chamber is mounted for movement longitudinally of the side rails 22 and the bellows is therefore extended or contracted according to the direction of movement of the exposing chamber. It is understood, of course, that the lens board is fixed on brackets such as 30 and that the prism is likewise in fixed position with respect to the lens board.

The copy holder 29 is guided with respect to the front posts 21 and it is moved up and down by a screw or screws such as 31 that may be threaded in a nut or nuts 32, which latter are stationary on the copy holder structure. Types of devices for raising and lowering copy holders by screws are so well known that further detailed description is believed unnecessary. The manually operated crank 33 is on a shaft 34 that is geared to the screw, and therefore as the crank is turned in one or another direction, the copy holder will be moved, that is to say, it will either be elevated or lowered.

In providing means for moving the copy holder and the exposing chamber simultaneously and in time, or in proportional distances in order that the location of the film will always be in focus, guide posts 35 and 36 are stationed approximately vertically in the frame, although they are slightly diagonal with respect to the vertical and the lower ends are nearer the front of the frame than are their upper ends. These posts are secured by clamps or other anchoring devices 37 to the frame structure and in such spaced relation to each other as to afford a clearance between them for a cross head 38.

The cross head comprises, in the present embodiment of the invention, a sleeve 39 associated with sleeves 40 and 41 and the said sleeve 39 is trunnioned on the sleeves 40 and 41. The sleeves 40 and 41 are slidable longitudinally of the guide posts 35 and movement is imparted to them by the flexible elements 42 and 43, respectively, here shown as sprocket chains. One end of each flexible member is secured to a sleeve by a fastening 44 such as a screw or the like, whereas the other end of the same flexible member is connected to the sleeve by an adjustable device 45 such as a screw, turnbuckle or the like, and this provides an adjustment that will permit taking up lost motion to insure a close adjustment for these operating parts of the mechanism. The sprocket chains are connected to the copy holding structure by suitable fastenings 46 such as screws or the like, and therefore, as the copy holder is raised or lowered, the cross head will be lowered or raised. It is shown that the sprocket chains each operates over suitably located idlers 47, 48, 49 and 50, the latter of which has its trunnion or shaft located above the zone of movement of the cross head and with the periphery of the idler arranged to direct the flexible element or member in alinement with the posts 35 transversely of the frame.

In order that the exposing chamber may be moved simultaneously and proportionate to the movement of the copy holder for maintaining the focus, a lever 51 in the nature of a bell crank is oscillatable at its angle on a pivot 52. One arm 53 of the lever is pivotally connected at 54 to a telescopic element or tube 55 and another telescopic element or rod 55$^a$ slides therein and it is pivotally connected as at 56 to a structure that will communicate motion to the exposing chamber in a direction longitudinally of the side rails. The tube 55 is slidable in the sleeve 39 and the trunnions of the sleeve permit an oscillatory movement of the said tube, while at the same time the said rod may reciprocate in the tube.

When the parts are in the positions shown in full lines, Fig. 2, an upward movement of the copy holder will result in moving the sleeve 39 downwardly on the tube, and since the movement of the sleeve is parallel with the posts 35, the tube 55 and rod 55$^a$ will be rocked but slightly during the initial downward movement of the cross head, and the movement imparted to the exposing chamber will be very slight and nearly at the same rate of movement as the copy holder, but as the copy holder approaches the prism, the movement of the exposing chamber away from the lens must be accelerated to maintain a focus according to the well known rules. As the rod is moved, therefore, it must move axially to a greater degree than before and it must swing or tilt longitudinally of the frame to a greater degree proportional to the movement of the chamber. In order to accomplish this result, the other arm of the lever 51 is connected to a bifurcated guide 57 by a fastening 58, such as a bolt or the like, and the guide is maintained at a certain angle with respect to the lever, and the relation of parts is well shown in Figure 11. Provision is made for an adjustment at the joint between the arm of the lever 51 and the guide 57, as indicated by the clearance at 57ª. The guide can be secured, as stated, at different angles with respect to the lever 51 and this adjustment constitutes a means by which the apparatus can be set for correct operation where lenses of slightly different focal lengths are used. Of course, in apparatus of this type, lenses are used having substantially the same focal length, but in their manufacture fractional tolerance is permitted and provision is therefore made in this construction for setting the machine to operate properly with such different lenses.

The degree of inclination of the guides may be also a factor in the correct adjustment of the operating parts, and to that end, the upper ends of the said guiding posts are adjustably connected to the frame through means of brackets A having longitudinally disposed channels or slots in which the post anchoring means may be adjustably secured at different positions, a condition which will result in increasing or diminishing the obliquity of the posts.

The guide 57 is of a structure or configuration to coact with the cross head, the guide extending upwardly and rearwardly between the guide posts 35 and 36, and preferably, the sleeve 39 of the cross head travels between the furcations or arms 59 and 60 of the guide, and the trunnions extend through the sides of the guide and engage the edges of the arms, a condition which will cause the cross head to rock the lever. When movement is imparted to the lever, the movement of the rod is accelerated, since the throw of the lever from the position in which it is shown in Fig. 2 to the position in which it is shown in Fig. 1 will serve to augment or accelerate the movement previously imparted to the rod, by the sleeve sliding on the tube, when said sleeve is near the top of the frame. As the tube is raised at its lower end, an increased length of tube is above the sleeve and a shorter length is below the sleeve. It is understood, as stated, that the sleeve is the fulcrum for the tube and the sweep of the tube above the fulcrum will be greater than the movement of lower end of the tube. The increased sweep thus imparted to the upper end of the tube, and consequently the rod which is slidable in it, results in the acceleration of the movement imparted to the exposing chamber, as compared with the movement of the copy holder, and this results in correlating the movement of the exposing chamber proportional to the movement of the copy holder and maintaining the focus.

It will be seen from an inspection of the drawings that during the initial downward movement of the cross head, the pivot of the tube 55 will be fixed at the lowermost position of the arm 53 of the lever and this position will be maintained until an accelerated movement of the exposing chamber is necessary to maintain the focus. When this stage of the adjustment is reached and it becomes necessary to increase the throw of the rod, the cross head moves into the guide 57, and imparts a slight tilting motion to it and to the lever 51, which lever will rock slightly on its pivot. Such movement will elevate the pivot of the tube 55 at 54 and move the pivot of the tube near the sleeve in which it is slidable, thus increasing the length of the tube above the pivot and increasing the distance traveled by the upper end of the tube, as compared with the distance it would move were it not changed with respect to its fulcrum. It will be seen that the movement of the exposing chamber will be greater, therefore, in proportion to the downward movement of the cross head and that such acceleration will result as the positions of the parts are changed and the lever moves from the full line position in Fig. 2 to the dotted line position of said figure.

It has been found in practice that where apparatus is made for making relatively large photographs and where the focal length of the lens is proportionately greater than the focal length of lens used in smaller machines, the ratio of movement of that portion of the apparatus holding the sensitized material to the movement of the copy holder is somewhat less than in such apparatus as have lenses of reduced focal length, and therefore, sufficient acceleration of the movement of the exposing chamber can be secured without employing the bell crank lever heretofore described. In such instances, the lever may be oscillatively mounted on a fixed pivot instead of on a pivot which is moved upwardly or downwardly in its operation.

In Fig. 13 there is illustrated not only a modified mounting of the lever, but a modified means for causing the oscillation of the lever and this modified means of operating the lever reduces friction and increases the ease of operation, although the principle is the same. Furthermore, in the modification it is shown that instead of connecting the upper end of the lever to means for moving the exposing chamber that the said lever may carry an indicator or pointer with relation to which a pointer or location on the moving parts of the apparatus associated with the exposing chamber, may be moved and brought into registry or alinement to insure proper positioning of the sensitized material relative to the lens and relative to the copy holder and lens.

In the modification, a frame 61, which is similar to the frame heretofore described, is shown associated with a copy holder 62 and operating means therefor, similar to those described and these act in conjunction with sprocket chains and other instrumentalities, heretofore described, the difference in the modification being that the posts 63 are angular in cross section, that the tube 64 is angular in cross section and the telescopic element 65 is likewise angular in cross section and conforms to the contour of the tube 64.

In the present embodiment of the invention, the cross head is made up of the traveling sleeves 66 and 67 that move up and down on the posts 63 under the influence of the chain and the operating parts which have been described in connection with a disclosure of the other form of the invention. As the preferred construction for the sleeves of the modification, each comprises a cheek plate 68 and 69 in which trunnions 70 of rollers 71 are set. Four such rollers are employed for each sleeve, one at each corner of the cheek plates, and these rollers have flanges which act as guides in cooperation with the posts with relation to which they travel approximately vertically. The oscillatively mounted sleeve which is trunnioned between the two sleeves just described is also provided with cheek plates 72 and 73, having the rollers 74, one of which is mounted at each of the corners of the cheek plates. The rollers 74 have flanges which embrace the tubular lever 64, acting as a guide therefor, as the rollers ride up and down on the lever 64. The lever 64 is oscillatable on a pivot 75 supported near the bottom of the frame, and the said tube extends upwardly and rearwardly through the sleeve, and the telescopic member 65 of the lever may be connected for operating the exposing chamber in any appropriate way, as the lever 55ª is connected to the mechanism for moving the exposing chamber.

Where relatively large apparatus is made, however, considerable power will be required to move the exposing chamber and it might be desirable, under certain conditions, to utilize the lever and its telescopic member as a means for locating the position to which the exposing chamber may be adjusted for obtaining a proper focus when the copy holder is in predetermined positions and then to move the exposing chamber by some other means, as by rack and pinion or the like, as is done conventionally in these types of machines.

If the last mentioned operation is desired, a marker, pointer or indicator 76 may be associated with the telescopic member 65 and it may be placed to be moved longitudinally of the frame or a guide 76ª in order that when it is in proper position, a marker, indicator or graduation such as 77 carried by a movable part of the apparatus may be brought into registry, alinement or such juxtaposition to the indicator as to properly locate the exposing chamber and the parts of the apparatus for insuring a focus.

The inner cheek plates 68 of the sleeves 66 and 67 have trunnions connected to them on which the central sleeve is oscillatable and the joint between them is shown in Fig. 15.

Where the device is used with large apparatus and in connection with lenses having focal lengths such as are necessary for large apparatus, as, for instance, where the print to be made is as large as twenty-four inches, the movement to be imparted to the exposing chamber varies in proportion to the movement to be imparted to the copy holder. When setting the exposing chamber for focusing, the movement to be imparted to the exposing chamber is retarded approximately mid way of its adjustment longitudinally of the frame, and its movement thereafter rearwardly from the lens is accelerated with respect to the movement of the copy holder. In order to accomplish the result thus indicated, the pivot 75 is carried by an arm 78 which is secured on a shaft 79. The shaft has a toothed wheel 80 secured on it and the wheel meshes with a wheel 81 on a shaft 82. A lever 83 is secured on the shaft 82 and it oscillates, under certain conditions, for the purpose of partially rotating the wheels 80 and 81 and for raising and lowering the pivot 75 of the lever 64.

The lever 83 is of forked construction at its upper end and the furcations 84 and 85 thereof straddle one of the trunnions, and the sleeve is intended to impart motion to the lever 83. The lever 83 has a cam slot 88 which extends forwardly from the space between the furcations and the said cam slot terminates in a slot 89 which is parallel with the lever 83. With the arrangement just stated, the upper end of the lever 83 will stand parallel with the guides 63 and the movement of the sleeve vertically from the top of the lever 83 to the upper end of the cam slot 88 will result in the lever 83 being stationary, but when the sleeve descends into the cam slot 88, it will tend to move the lever 83 rearwardly and this movement through the toothed wheels 80 and 81 will result in dipping or moving downwardly the pivot 75 of the lever 64 and in effect lengthening the lever 64 to retard the movement of the indicator. When the straight portion 89 of the slot is encountered, the lever 83 will be retained against further movement during the further descent of the sleeve, whereas, of course, a reverse movement or elevation of the sleeve will result in a reverse movement of the apparatus just described.

It is well known that where a prism is employed as a part of the light projecting means, the distance from the lens to the object and the distance and the movement of one with relation to the other for focusing is not the same as though the prism were not intervening, and this is known in the art as the distance around the prism. Applicant's camming device or the mechanism for the acceleration of movement of one part with relation to the other is included in the disclosure and it is associated and is included in the proportioning of the means for creating the relative movements of the copy holder and the holder of the sensitized element with relation to the prism.

The camming mechanism has been described and the manner of increasing or retarding movements of the several parts has been fully stated.

The mechanism of the invention which compensates for the lens and prism by peculiarities previously referred to is the gear action which changes the length of the diagonal member 55, 55ª, which increases in length due to the telescopic action when the camera part is being moved backward for enlarging.

I claim:

1. In a photographing apparatus, a light projecting means, a copy holder and an exposing chamber, means for moving the copy holder with relation to the light projecting means, a bell crank lever pivotally mounted in operative relation to the copy holder, a lever oscillatively mounted on one arm of the bell crank lever and pivotally connected to the exposing chamber, means moved by the copy holder for imparting motion to the lever, and auxiliary means associated therewith for operating the bell crank lever.

2. In a photographing apparatus, a light projecting means, a movably mounted copy holder and a movably mounted exposing chamber, means for moving the copy holder with relation to the light projecting means, a guide obliquely positioned with respect to the direction of movement of the copy holder and at an angle to the direction of movement of the exposing chamber, a member movable longitudinally of the guide, means for imparting the movement of the copy holder to the said member, a lever in slidable engagement with said member and fulcrumed thereon, an element slidable in said lever and forming an extension thereof, means for pivotally connecting the extension to the exposing chamber, a bell crank lever oscillatively mounted at its angle on a fixed pivot, one arm of which is slidably engaged by the member, whereby the member rocks the bell crank lever, and a pivot connecting the slidable and oscillatable lever to the other arm of the bell crank lever.

3. In a photographing apparatus, a light projecting means, a movably mounted copy holder and a movably mounted exposing chamber, means for moving the copy holder with relation to the light projecting means, a guide obliquely positioned with respect to the direction of movement of the copy holder and at an angle to the direction of movement of the exposing chamber, a member movable longitudinally of the guide, means for imparting the movement of the copy holder to the said member, a lever in slidable engagement with said member and fulcrumed thereon, an element slidable in said lever and forming an extension thereof, means for pivotally connecting the extension to the exposing chamber, a bell crank lever oscillatively mounted at its angle on a fixed pivot, one arm of which is slidably engaged by the member, whereby the member rocks the bell crank lever, a pivot connecting the slidable and oscillatable lever to the other arm of the bell crank lever, and means for adjusting the obliquity of the guide with respect to the paths of travel of the copy holder and the exposing chamber, for the purpose described.

4. In a photographing apparatus, a light projecting means, a copy holder, and an exposing chamber, means for moving the copy holder with relation to the light projecting means, an oscillatively mounted lever associated with the apparatus and operative to move the exposing chamber, a bell crank to which the lever is pivoted, and means for imparting motion to the said lever and to the bell crank.

5. In a photographing apparatus, a light projecting means, a copy holder and an exposing chamber, means for moving the copy holder with relation to the light projecting means, an oscillatively mounted bell crank lever, a lever having one end pivotally connected to an arm of the bell crank and operative to move the copy holder, inclined guiding means constituting a part of the apparatus, an element mounted for movement parallel with the said guiding means having means for engaging the lever to rock said lever, and auxiliary means for moving the bell crank on its pivot.

GEORGE C. BEIDLER.